United States Patent
Efraty

(10) Patent No.: US 11,000,806 B2
(45) Date of Patent: May 11, 2021

(54) HYDRAULIC-ARM AIDED CLOSED CIRCUIT BATCH-RO DESALINATION APPARATUS OF LOW ENERGY AND HIGH RECOVERY PROSPECTS

(71) Applicant: DESALITECH LTD., Kfar Saba (IL)

(72) Inventor: Avi Efraty, Har Adar (IL)

(73) Assignee: DESALITECH LTD., Kfar Saba (IL)

( * ) Notice: Subject to any disclaimer, the term of this patent is extended or adjusted under 35 U.S.C. 154(b) by 0 days.

(21) Appl. No.: 16/484,115

(22) PCT Filed: Mar. 29, 2018

(86) PCT No.: PCT/IL2018/050365
§ 371 (c)(1),
(2) Date: Aug. 7, 2019

(87) PCT Pub. No.: WO2018/185746
PCT Pub. Date: Oct. 11, 2018

(65) Prior Publication Data
US 2020/0016538 A1    Jan. 16, 2020

(30) Foreign Application Priority Data
Apr. 2, 2017    (IL) .......................................... 251499

(51) Int. Cl.
*B01D 61/08* (2006.01)
*B01D 61/02* (2006.01)
(Continued)

(52) U.S. Cl.
CPC ........... *B01D 61/08* (2013.01); *B01D 61/025* (2013.01); *B01D 61/12* (2013.01); *C02F 1/008* (2013.01);
(Continued)

(58) Field of Classification Search
CPC ...... B01D 61/08; B01D 61/025; B01D 61/12; B01D 2311/14; B01D 2311/25;
(Continued)

(56) References Cited

U.S. PATENT DOCUMENTS 4,983,301 A    1/1991    Szucz
9,233,340 B1 *   1/2016    Elish ..................... B01D 61/10
(Continued)

FOREIGN PATENT DOCUMENTS

WO    2005016830    2/2005

*Primary Examiner* — Joseph W Drodge
(74) *Attorney, Agent, or Firm* — Soroker Agmon Nordman

(57) ABSTRACT

An inventive apparatus for closed circuit batch-RO desalination comprising a RO-skid with membrane elements and circulation means for the recycling of RO concentrate through membranes and a designed hydraulic-arm with a disc separating between a section of pressurized hydraulic fluid created by a high pressure hydraulic pump under fixed flow and variable pressure conditions and a section of RO recycled concentrates. The batch desalination sequence is completed when the entire hydraulic-arm volume is filled with hydraulic fluid and thereafter, desalination is stopped, said apparatus decompressed, brine removed and hydraulic-arm recharged with fresh feed before the initiation of a new batch sequence. The inventive apparatus enables RO desalination under the lowest energy and highest recovery prospects not possible by any other RO technique.

8 Claims, 7 Drawing Sheets

(51) Int. Cl.
*B01D 61/12* (2006.01)
*C02F 1/00* (2006.01)
*C02F 1/44* (2006.01)
*C02F 103/08* (2006.01)

(52) U.S. Cl.
CPC .......... *C02F 1/441* (2013.01); *B01D 2311/14* (2013.01); *B01D 2311/25* (2013.01); *B01D 2313/18* (2013.01); *B01D 2313/24* (2013.01); *B01D 2313/50* (2013.01); *B01D 2317/04* (2013.01); *B01D 2317/06* (2013.01); *C02F 2103/08* (2013.01); *C02F 2201/005* (2013.01); *C02F 2209/006* (2013.01); *C02F 2209/03* (2013.01); *C02F 2209/40* (2013.01); *C02F 2301/046* (2013.01)

(58) Field of Classification Search
CPC ............ B01D 2313/18; B01D 2313/24; B01D 2313/50; B01D 2317/04; B01D 2317/06; B01D 61/06; B01D 61/10; B01D 2311/08; B01D 2313/243; B01D 2313/246; B01D 2313/36; B01D 2319/04; C02F 1/008; C02F 1/441; C02F 2103/08; C02F 2201/005; C02F 2209/006; C02F 2209/03; C02F 2209/40; C02F 2301/046; C02F 1/445; C02F 2201/009; Y02P 70/10; Y02A 20/124; Y02A 20/13; Y02A 20/131; Y02A 20/138
USPC ............... 210/321.66, 637, 652; 290/52, 54; 417/313, 390; 60/327, 328, 398, 641.1
See application file for complete search history.

(56) References Cited

U.S. PATENT DOCUMENTS

| | | | |
|---|---|---|---|
| 2006/0124546 A1* | 6/2006 | Wobben | F04B 9/115 210/637 |
| 2006/0254981 A1* | 11/2006 | Efraty | C02F 1/441 210/637 |
| 2006/0257981 A1* | 11/2006 | Shue | C12P 19/62 435/124 |
| 2006/0273009 A1* | 12/2006 | Gordon | C02F 1/441 210/652 |
| 2008/0023410 A1* | 1/2008 | Efraty | B01D 61/022 210/741 |
| 2009/0071902 A1* | 3/2009 | Stover | F01K 27/005 210/637 |
| 2009/0173690 A1 | 7/2009 | Oklejas | |
| 2009/0242471 A1* | 10/2009 | Shinoda | C02F 1/441 210/170.11 |
| 2010/0270237 A1* | 10/2010 | Efraty | B01D 61/025 210/637 |
| 2010/0320772 A1* | 12/2010 | Efratyi | F03D 9/28 290/55 |
| 2012/0103906 A1* | 5/2012 | Efraty | B01D 61/022 210/652 |
| 2014/0007564 A1* | 1/2014 | Efraty | F03G 7/04 60/327 |
| 2015/0298062 A1* | 10/2015 | Zhu | B01D 61/06 210/637 |
| 2015/0367285 A1* | 12/2015 | Chang | B01D 61/025 210/652 |
| 2016/0010632 A1* | 1/2016 | Knowles, Jr. | F03B 13/14 417/53 |
| 2017/0209834 A1* | 7/2017 | Cohen | B01D 61/08 |
| 2018/0207584 A1* | 7/2018 | Chang | B01D 61/022 |
| 2019/0151798 A1* | 5/2019 | Lafortune | B01D 61/06 |

* cited by examiner

HYDRAULIC-ARM AIDED CLOSED CIRCUIT BATCH-RO DESALINATION APPARATUS OF LOW ENERGY AND HIGH RECOVERY PROSPECTS

BACKGROUND OF THE INVENTION

Closed circuit desalination (CCD) in apparatus of fixed, intrinsic volume under fixed flux and variable pressure conditions [Efraty, PCP/IL2005/000670, "CONTINUOUS CLOSED CIRCUIT DESALINATION APPARATUS WITHOUT CONTAINERS", and PCT/IL2004/000748 "APPARATUS FOR CONTINUOUS CLOSED CIRCUIT DESALINATION UNDER VARIABLE PRESSUER WITH A SINGLE CONTAINER"] claimed a new class of low energy high recovery batch desalination processes which can be made continued on a consecutive sequential basis. Under CCD conditions, the flow rates of pressurized feed ($Q_F$), permeate ($Q_P$) and recycled concentrates ($Q_{CP}$) remain unchanged, $Q_F=Q_P$ and the recycled concentrate mixed with fresh pressurized feed at module inlet. Power increase on recovery during CCD proceeds by cycles of fixed time duration (T) expressed by $T=V_i/Q_{CP}$; wherein, $Q_{CP}$ stands for fixed cross flow of the circulation pump and $V_i$ for the fixed intrinsic volume of the closed circuit, with batch sequence power demand on recovery expressing the average power over the number of cycles (n) required to reach the desired batch recovery. Specific energy (SE) of a defined cycle (n) during the CCD sequence may be expressed by $SE_n=T*P_n/(T*Q_P)=P_n/Q_P$; wherein, $P_n$ stands for the power demand of the defined cycle (n) and $Q_P$ for the fixed flow rate of permeate, with batch sequence average (av-SE) on recovery expressing the average energy over the number of cycles (n) required to reach the desired batch recovery.

Very recently, Warsinger et al ["*Energy efficiency of batch and semi-batch* (CCRO) *reverse osmosis desalination*", Water Research 106 (2016) 272-282.] and Werber at al [*"Can batch or semi-batch processes save energy in reverse-osmosis desalination?", Desalination* 402 (2017) 109-122.] described batch-RO techniques with closed circuit apparatus comprising variable-volume high pressure tanks of declined volume on recovery of the lowest projected energy demand near the theoretical limits. Implementation of the batch-RO approach according to Warsinger et al citation of a provisional application ["Batch Pressure-driven Membrane Desalination with Closed Flow Loop and Reservoir Tank"] is made possible in an apparatus comprising a pressure-vessel with membrane elements in front and a permeate bladder in the rear, a circulation pump for concentrate recycling from outlet to inlet of said pressure vessel, and a high pressure pump for pressurizing the received permeates to said permeate bladder thereby, causing a declined closed circuit intrinsic volume as function of batch recovery If operated under fixed flow and variable pressure conditions, the cycle duration is shortened continuously with a declined accumulation of permeates per subsequent cycle which translates to a declined weight of subsequent cycles on the av-SE and the av-TDS of permeates.

The present patent application describes the implementation of the hydraulic-arm concept for batch-RO desalination of low energy and high recovery

SUMMARY OF THE INVENTION

The invention describes a batch-RO apparatus based on hydraulic-arm (HA) principles comprising a pressure-vessel (PV) with a separation disc (SD) wherein pressurized hydraulic fluid received from a high pressure hydraulic pump (HPHP) compresses a recycled salt water solution of increased salinity through RO membranes in modules) inside a RO-skid under fixed flow and variable-pressure conditions. A mixing device (MD) inside the salt water solution section of said hydraulic-arm (HA) blends its content with the recycled concentrates received from the membranes. The mixing device may comprise an electric or electromagnetic drive. Desalination in the inventive batch-RO apparatus proceeds under constant flux, module recovery, and cross-flow with a declined intrinsic volume of recycled concentrates and identical flow rates of permeate and hydraulic fluid. The inventive batched desalination sequence is stopped when the displaced volume in said HA reaches a predefined maximum. Preparation of said apparatus for the next desalination batch desalination sequence proceeds by a two-step process with a low pressure feed pump (LPFP); the $1^{st}$ step of brine replacement by feed in said RO-skid and a small section of said HA, and the $2^{nd}$ step of salt water solution recharge of said HA with hydraulic fluid displacement to its hydraulic fluid reservoir (HFR).

According to some embodiments, an apparatus for batch closed circuit desalination of a salt water solution feed by reverse osmosis (RO) comprises hydraulic power means (HP), hydraulic-arm (HA) means, RO means, and feed recharge means (FR), whereby the HP comprise a line of hydraulic fluid (HF) with pressurizing means for the delivery of pressurized HF from a hydraulic fluid reservoir (HFR) to the HA, thereby providing hydraulic power to the apparatus, a non-pressurized HF line for non-pressurized HF return from the HA to the HFR, and an actuated valve and check valve means, whereby either pressurized HF is supplied to the HA or alternatively retrieved from the HA to the HFR;

the HA comprise a single pressure vessel (PV) with a separation disc (SD) inside between the HF and the feed, or several PVs connected in parallel, wherein HF is supplied/retrieved from a first end of the HA, whereas the feed and concentrates of the feed created inside the HA during RO desalination are supplied/retrieved from a second end of the HA, while the second end of the HA further comprises a mixing device (MD) means to enable effective blending of the concentrates inside the HD;

the RO comprising a RO-skid with one module of a selected number of membrane elements, or more than one module with their inlets and outlets connected in parallel, a recycling line with a circulation means for closed circuit recycling of the concentrates blend inside the HA through the RO-skid;

the FR comprising a feed line with a low pressure supply means connected to the concentrates recycling line, a brine removal line extension from the concentrates recycling line, actuated valve and check-valve means on the above referred lines (i.e., the concentrates recycling line, and the brine removal line) to enable one of three discrete operations at a time of the concentrate recycling during RO, or the brine removal without RO, or the feed recharge of the HA without RO further associated with the HF release to the HFR;

online monitoring means of pressure on the inlet ($P_{in}$) and outlet ($P_{out}$) lines of the RO-skid, of flow or volume on the recycling line down stream of the circulation means ($FV_{CP}$), and of flow or volume on the pressurized HF line to the HA ($FV_H$); and a computerized control board means, whereby the entire operation of the apparatus is managed automatically on the basis of the online monitored data in conjunction with selected set-points flow rates and volumes.

In some embodiments, the pressurizing means comprise a high pressure hydraulic pump (HPHP) with a variable frequency drive (vfd) means capable of a fixed flow and variable pressure operation with an aid of a flow or volume means located upstream or downstream ($FV_H$) of the high pressure hydraulic pump.

In some embodiments, the circulation means comprise a circulation pump (CP) of low pressure difference boosting with a variable frequency drive (vfd) means capable of a fixed flow operation with an aid of a flow or volume, means located upstream or downstream ($FV_{CP}$) of the circulation pump.

In some embodiments, the mixing device (MD) means comprise an electric or electromagnetically driven mixer with a variable frequency drive (vfd) means capable of vigorous mixing of the recycled concentrates inside the HA at the beginning of a desalination sequence with a progressively declined mixing rate towards the end of the sequence.

In some embodiments, the low pressure supply means comprise a low pressure feed pump (LPFP) of high flow delivery rate to enable the brine removal and feed recharge steps between RO sequences completed over a brief time duration.

In some embodiments, the computerized control board means automatically actuate the apparatus by the following steps:
  (1) proceeding Batch-RO with selected flow rate set-points of the HPFP-vfd and CP-vfd and mixing rate of the MD-vfd means with valve means configured to enable only the execution of the batch-RO desalination sequence with declined mixing, wherein Batch-RO desalination is stopped when the cumulative HF volume, same as the cumulative permeate volume, monitored by the $FV_H$ means reach a predefined volumetric set-point ($V_{HF}$) which signified the end of the batch RO sequence;
  (2) when the $V_{HF}$ volumetric set-point is reached, the pumps and MD-vfd means of step (1) become idle, valve means configured to enable brine removal and its replacement by fresh feed, and the LPFP is activated until the replaced brine volume monitored by the $FV_{CP}$ means match the volumetric set-point ($V_B$) of complete brine removal;
  (3) when the $V_B$ volumetric set-point is reached, valve means are configured to stop brine removal in favor of feed recharge of the HA as well as to enable back flow HF from the HA to the HFR, wherein this step is completed when the feed volume admitted to the HA and monitored by the $FV_{CP}$ means match the volumetric set-point ($V_{RO}$) of a completely recharge HA, wherein $V_{RO}$ monitored by $FV_{CP}$ and $V_{HF}$ monitored by $FV_H$ are of identical value; and
  (4) when the $V_{RO}$ volumetric, set-point is reached, valve means are configured to their batch-RO sequence positions, the HPFP-vfd, CP-vfd and MD-vfd means are activated and a new batch-RO sequence is initiated according to step (1).

In some embodiments, the hydraulic fluid is any hydraulic fluid including permeates received during the operation of the apparatus.

In some embodiments, the salt water solution feed is any aqueous solution containing salts.

DETAILED DESCRIPTION OF THE INVENTION

Figure 1:
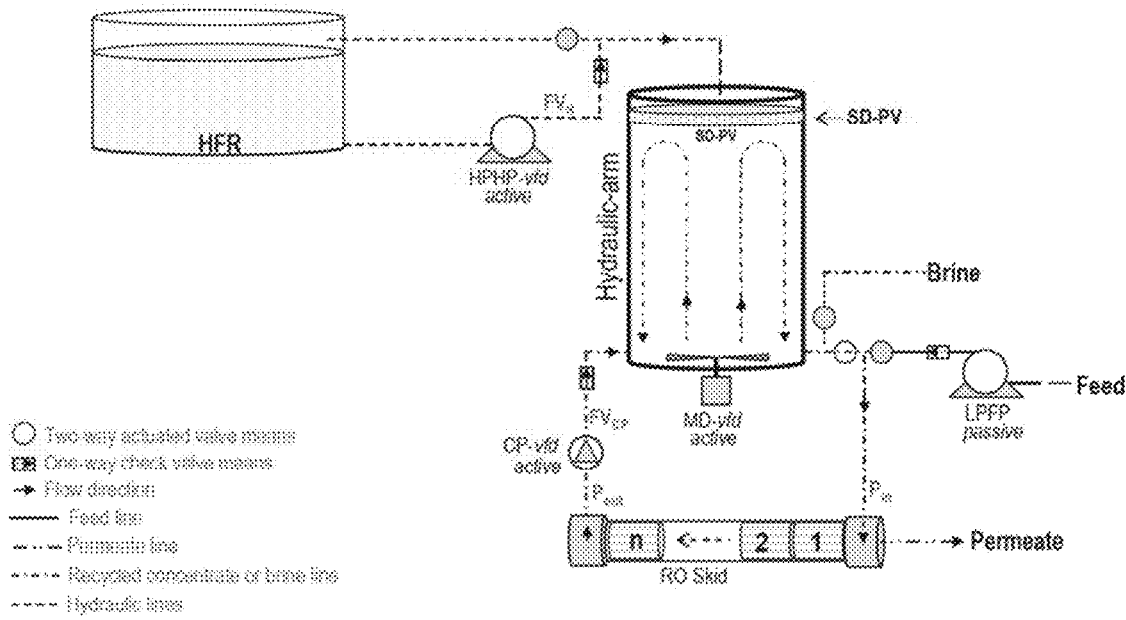
FIG. 1 schematically illustrates the configuration of the inventive batch-RO apparatus made of a single HA and a single-module (MEn) RO-Skid, with its active/passive components, conducting lines with flow directions and valve means positions, during the beginning of a desalination sequence.

The inventive batch-RO apparatus of the preferred embodiment and its components and actuation modes are described in FIGS. 1-6 at the level of conducting lines, valves means, flow direction in lines and active/passive components during the various steps of the batch desalination process, brine replacement by a fresh salt water solution feed and closed circuit volume recharge. The inventive apparatus comprises an integrated hydraulic power system combined with RU desalination means through HA means with a separation disc (SD) inside an empty pressure vessel (PV), wherein said feed and its subsequently created concentrates of increased salinity are recycled through the membrane elements of a RO-skid under fixed flow and variable pressure conditions of predefined selected set points of operation of constant flux and module recovery (MR), or instead of a permeate flow rate (hydraulic flow rate) and a cross-flow rate in membrane elements created by a circulation means.

The HA in the inventive apparatus is divided by the SD into two sections, one of hydraulic fluid and the other of salt water solutions of changing salinity. Batch desalination sequence in the inventive apparatus of the preferred embodiment in FIG. 1 begins with the activation of the high pressure hydraulic pump with variable frequency drive means (HPHP-vfd) for pressurization of hydraulic fluid (HF) into the hydraulic section of said HA under fixed flow ($Q_H$) and variable pressure conditions; thereby, affecting desalination in the aqueous section of said HA by the recycling of aqueous concentrates of increased salinity through the RO membranes in said RO-skid with identical flow rates of hydraulic flow ($Q_H$) and permeate flow rate ($Q_P$). The fixed flow rate delivery of HPHP is controlled by the means though the flow/volume monitoring means which could be locate either upstream or downstream (FVn) of said pump. Cross-flow over membranes inside modules of said RO-skid is controlled by a circulation pump (CP) with a variable frequency drive means (CP-vfd) through the flow/volume monitoring ($FV_{CP}$) means downstream of said pump. Monitored pressure at inlet ($P_{in}$) and outlet ($P_{out}$) of said RO-skid provide the pressure different ($\Delta P = P_{in} - P_{out}$) along module(s) which needs to be compensated by the circulation means (CP-vfd).

Blending of the recycled concentrates off said RO-skid with the declined volume of concentrates inside said HA is achieved by means of a mixing device with vfd means (MD-vdf) with maximum mixing speed applied at the beginning of a desalination sequence when said HA is fully charged with feed, and the mixing speed is steadily declined as function of the decreased volume of concentrates inside said HA.

Monitored volume ($FV_H$) supplied to said HA is equivalent to the HF volume withdrawn from the HFR and to the permeate volume produced in said RO skid. Permeate produced by said RO-skid may also serve as hydraulic fluid (HF). The volume of HF stored in the HFR is only little greater than the maximum displaced volume from said HA.

Figure 2:
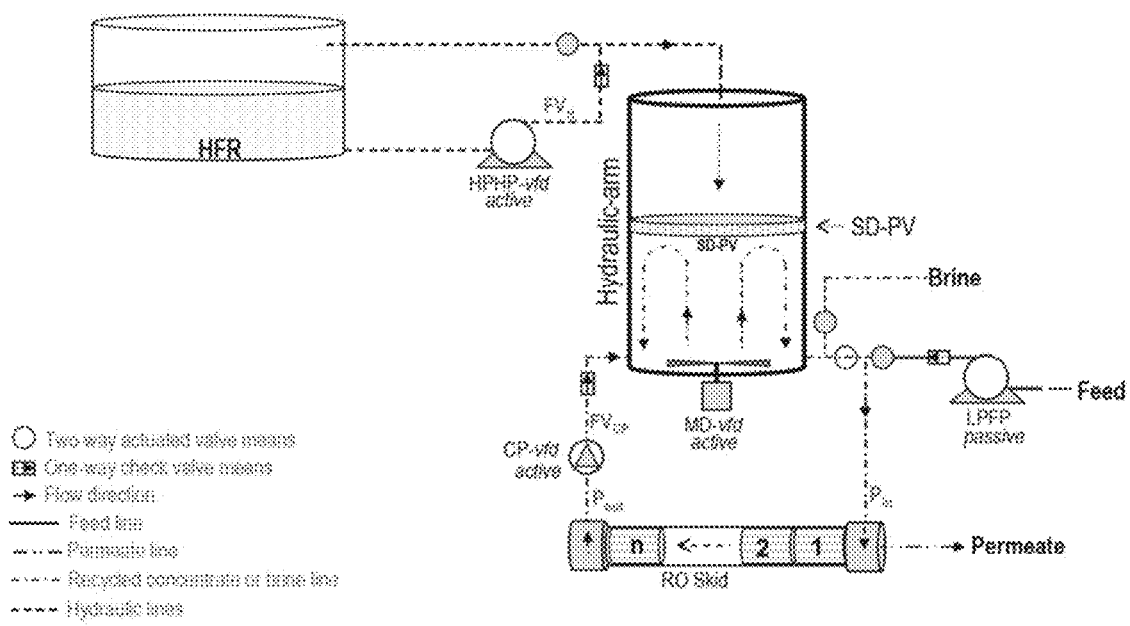
FIG. 2 schematically illustrates the configuration of the inventive batch-RO apparatus made of a single HA and a single-module (MEn) RO-Skid, with its active/passive components, conducting lines with flow directions and valve means positions, during the midpoint of a desalination sequence.
Figure 3:
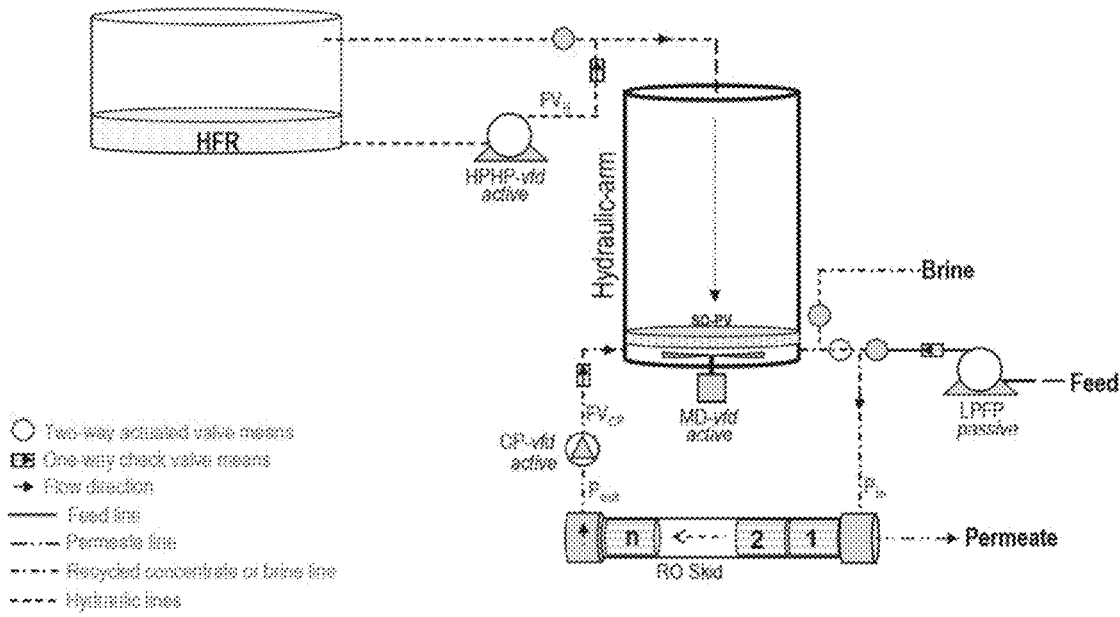
FIG. 3 schematically illustrates the configuration of the inventive batch-RO apparatus made of a single HA and a single-module (MEn) RO-Skid, with its active/passive components, conducting lines with flow directions and valve means positions, at near completion of a desalination sequence.

The desalination sequence in the preferred embodiment of the inventive batch-RO apparatus with emphasis on active/passive components, position and configuration of valve means, and flow direction in lines are revealed in FIG. 1, beginning of a desalination sequence illustrated in FIG. 1, midway of a desalination sequence illustrated in FIG. 2 and near completion of a desalination sequence illustrated in FIG. 3. Noteworthy features during the desalination sequence are the uncharged configurations of active/passive components, position of valve means and flow direction in lines and the shift of HF from the HFR to HA. The completion of desalination sequence takes place when the monitored HF volume by $FV_H$ reach the predefined volumetric set-point of maximum HF transfer ($V_{HF}$) from the HFR to the HA.

Figure 4:
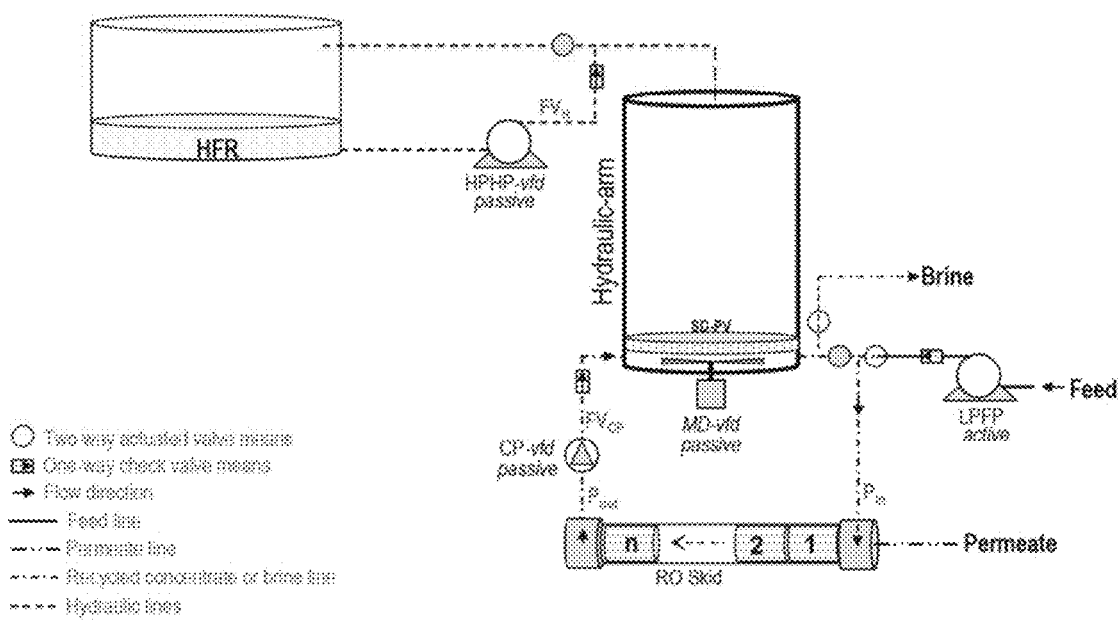
FIG. 4 schematically illustrates the configuration of the inventive batch-RO apparatus made of a single HA and a single-module (MEn) RO-Skid, with its active/passive components, conducting lines with flow directions and valve means positions, during the mode of brine replacement with fresh feed in preparation for a new desalination sequence.
Figure 5:
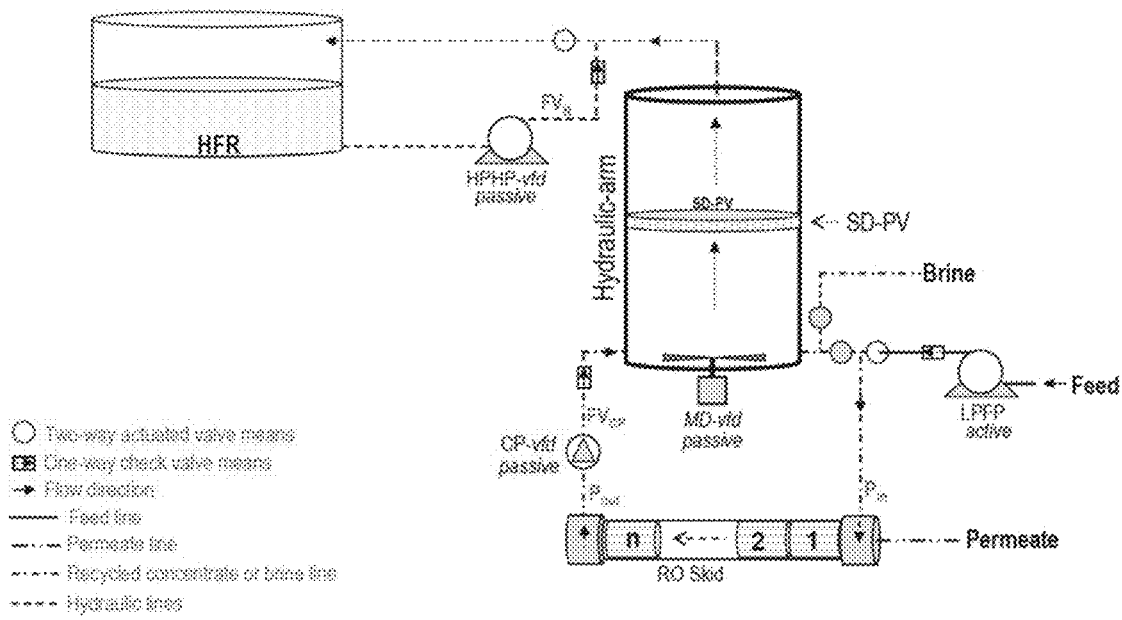
FIG. 5 schematically illustrates the configuration of the inventive batch-RO apparatus made of a single HA and a single-module (MEn) RO-Skid, with its active/passive components, conducting lines with flow directions and valve means positions, during the fresh feed recharge mode of the HA in preparation for a new desalination sequence.
Figure 6:
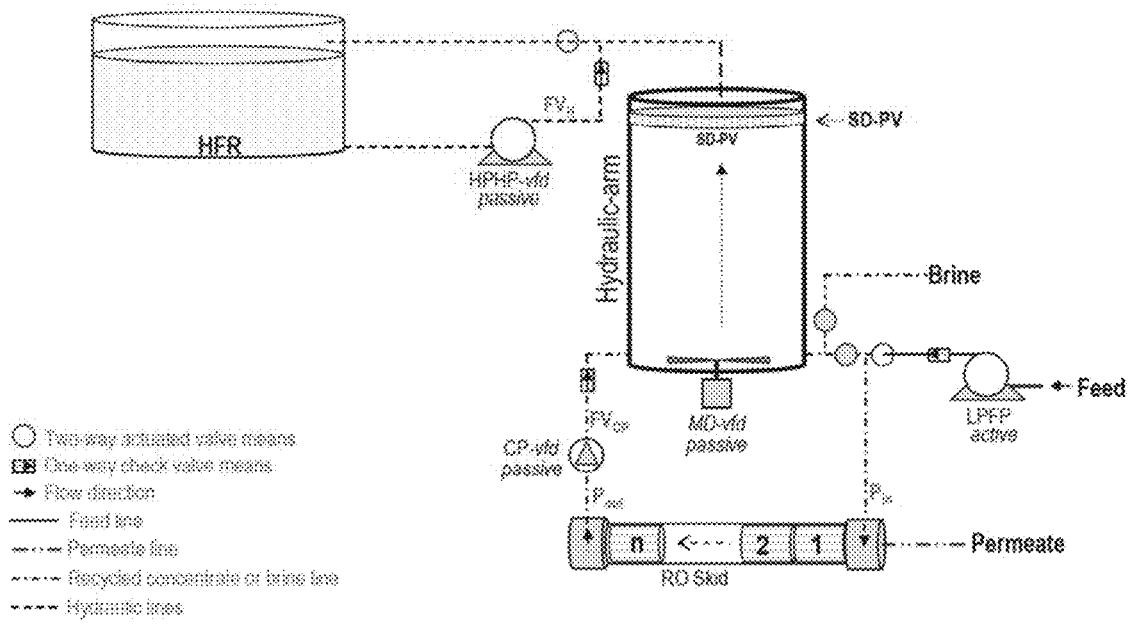
FIG. 6 schematically illustrates the configuration of the inventive batch-RO apparatus made of a single HA and a single-module (MEn) RO-Skid, with its active/passive components, conducting lines with flow directions and valve means positions, at the completion of the fresh feed recharge mode of the HA in preparation for a new desalination sequence.

Desalination in the inventive batch-RO apparatus of the preferred embodiment described hereinabove stops when the monitored HF volume transferred from HFR to HA reach a predefined volumetric set-point ($V_{HF}$) and such a signal triggers a configuration shift from FIG. 3 to FIG. 4 to enable a brine replacement by fresh feed at near atmospheric pressure from the RO-skid and a small section of the HA. During said shift, HPHP-vfd, CP-vdf and MD-vfd become passive and LPFP active with valve means configured to enable complete brine replacement by fresh feed at near atmospheric pressure from the above specified sections of the RO-skid and HD of a defined volume ($V_B$). Progress of said brine replacement step feed is monitored volumetrically by $FV_{CP}$ and stopped when the monitored replacement volume matches the defined volumetric set-point $V_B$ and such a control signal triggers a configuration shift from FIG. 4 to FIG. 5 by the closure of the brine rejection valve means and the opening of HF valve means on the line from the HA to the HFR and thereby, enable the recharge of said HA with a fresh salt water solution feed. The HA recharge step is completed (FIG. 6) when the monitored recharged volume on $FV_{CP}$ reaches a predefined volumetric set-point $V_{HA}$ which signifies a complete feed recharge of said HA as expected at the beginning of the desalination sequence. Incidentally, the $V_{HA}$ set-point monitored through $FV_{CP}$ is the same as volumetric set-point $V_{HF}$ of retrieved HF from HA to the HFR during the feed recharge mode. Attainment of the $V_{HA}$, same as $V_{HF}$, set-point by $FV_{CP}$ during the HA recharged mode, triggers the configuration shift from FIG. 6 to FIG. 1 by the deactivation of LPFP, the closure of the valve means on the feed inlet line to the apparatus and on the HF return line to HFR, and the opening of the valve means on the concentrate recycling line. Thereafter, a new batch-RO desalination sequence begins (FIG. 1) by simultaneous activation of HPHP-vfd, CP-vfd and MD-vfd and the initiation of the fixed flow and variable pressure mode of operation through the control board.

Figure 7:
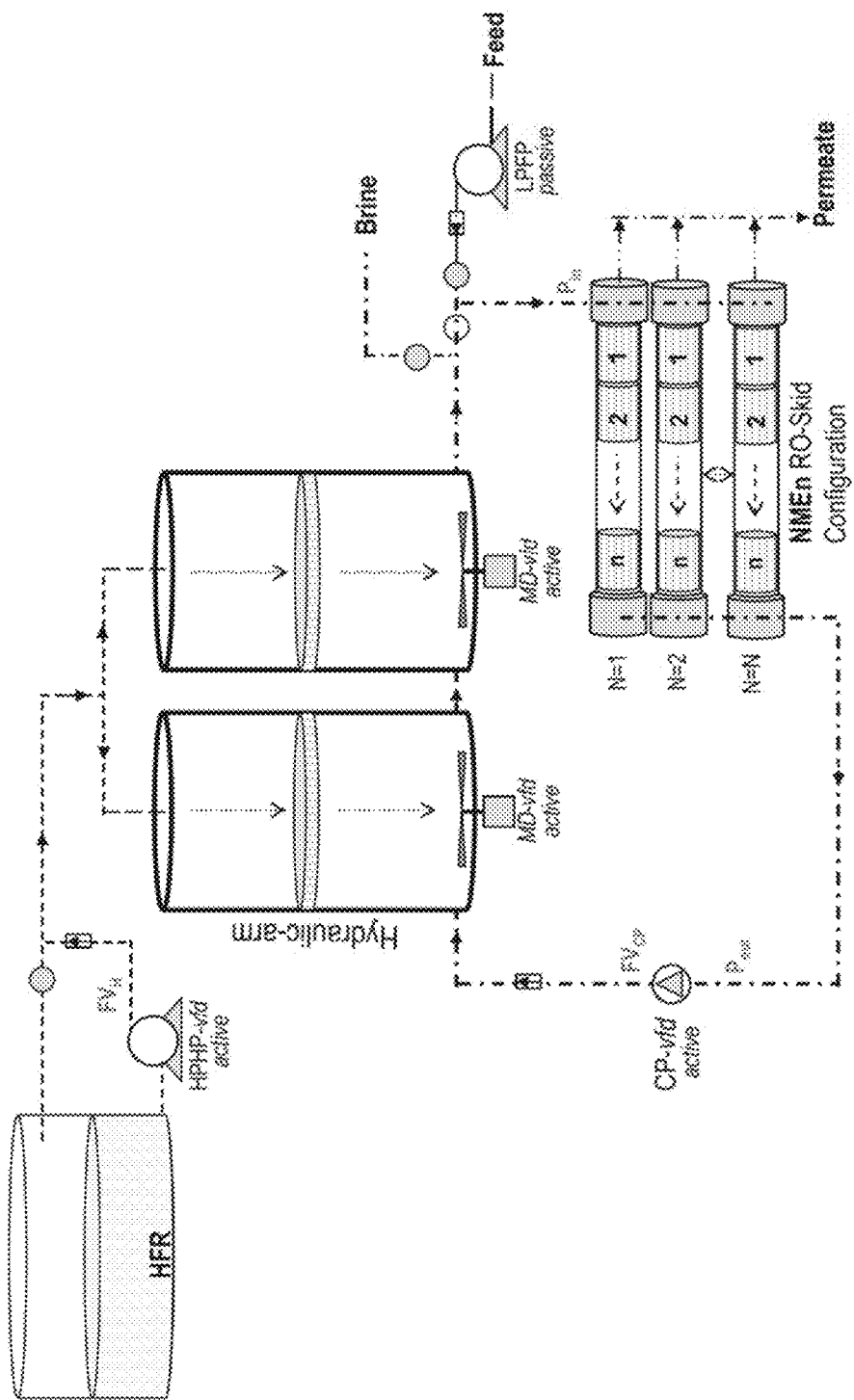
FIG. 7 schematically illustrates the configuration of the inventive batch-RO apparatus made of two HA in line and a multi-module (NMEn) RO-Skid, with its active/passive components, conducting lines with flow directions and valve means positions, during half-way of a desalination sequence.
Figure 8:
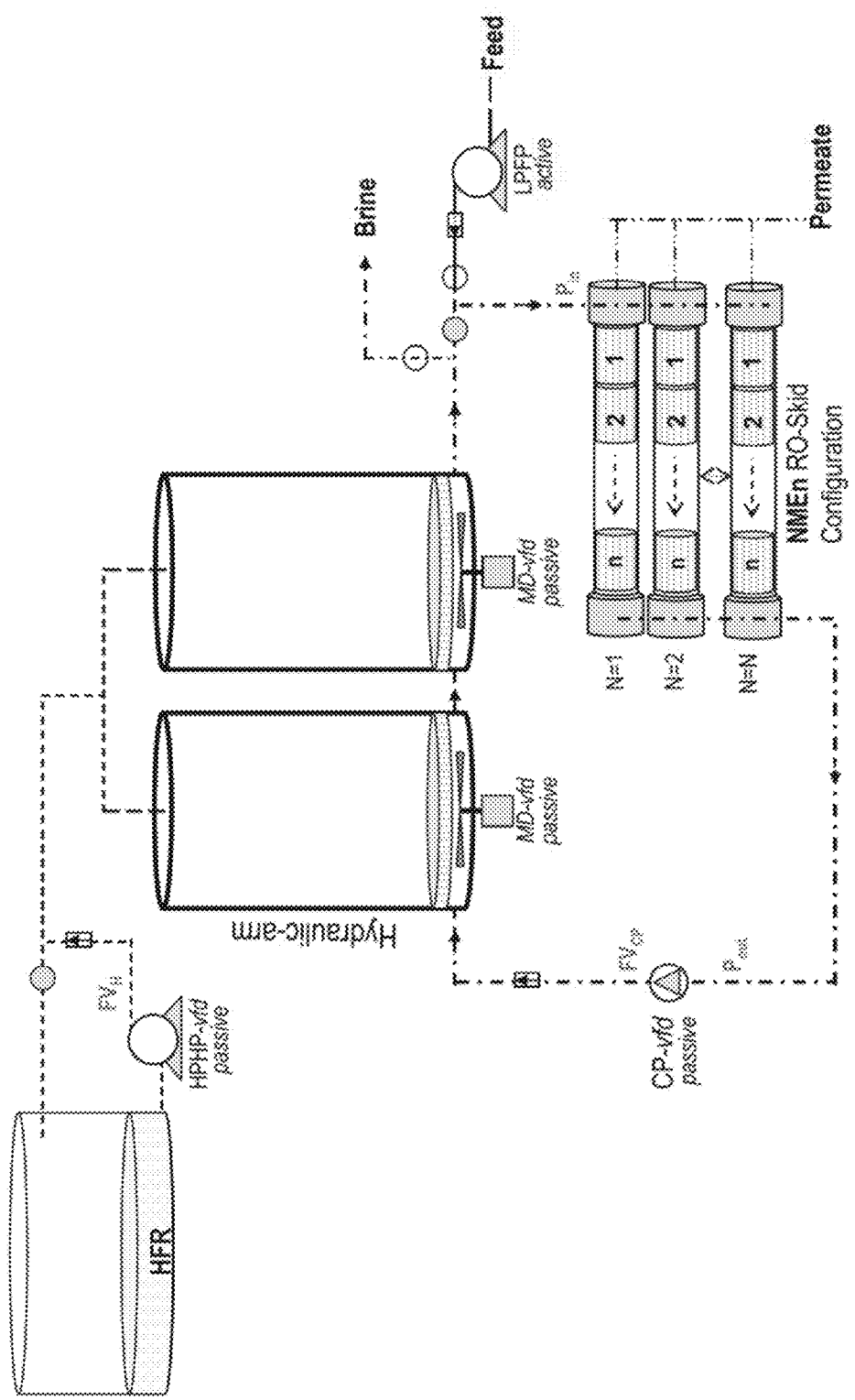
FIG. 8 schematically illustrates the configuration of the inventive batch-RO apparatus made of two HA in line and a multi-module (NMEn) RO-Skid, with its active/passive components, conducting lines with flow directions and valve means positions, during the mode of brine replacement with fresh feed in preparation for a new desalination sequence.
Figure 9:
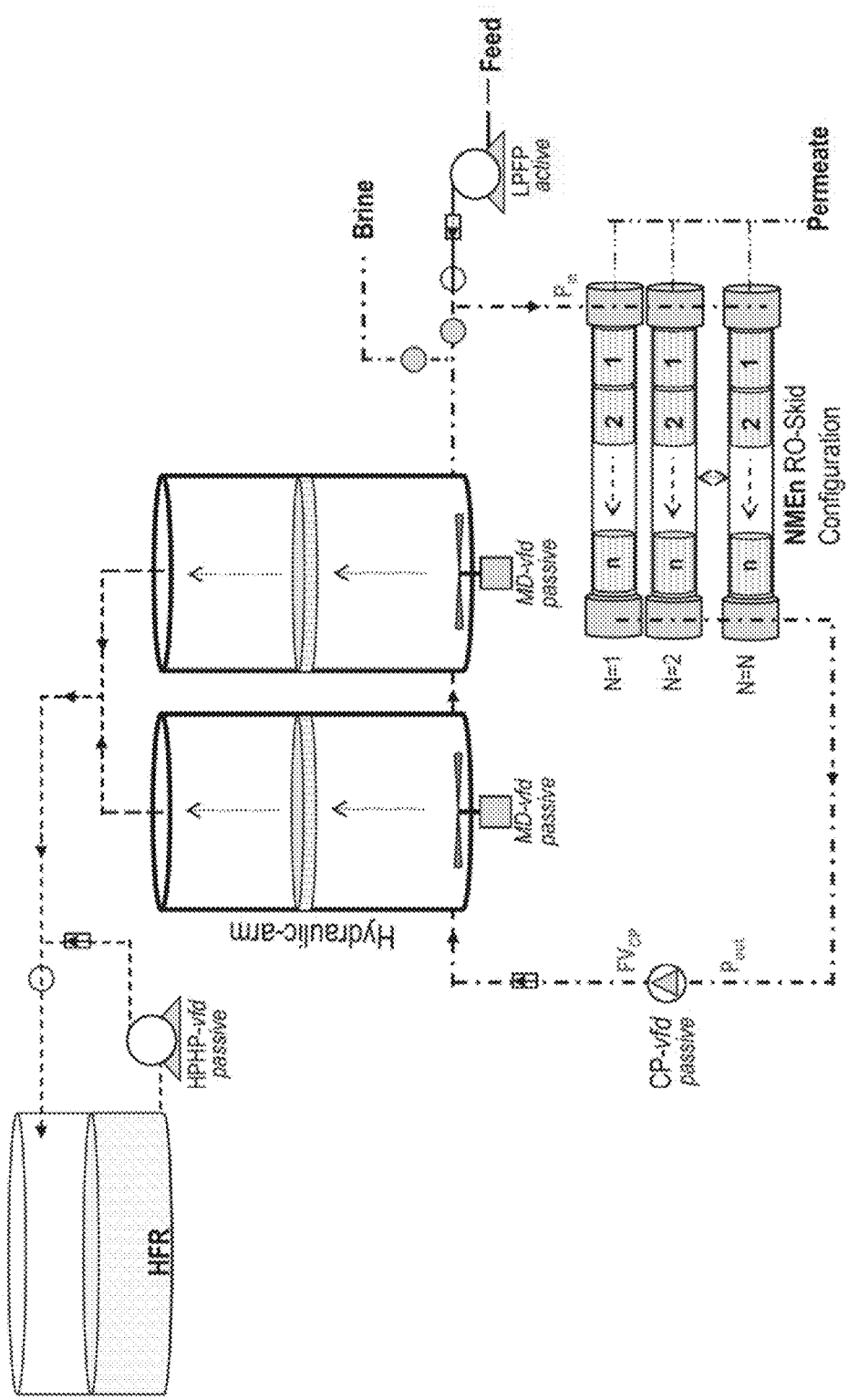
FIG. 9 schematically illustrates the configuration of the inventive batch-RO apparatus made of two HA in line and a multi-module (NMEn) RO-Skid, with its active/passive components, conducting lines with flow directions and valve means positions, during the half-way of the fresh feed recharge mode of said HA in preparation for a new desalination sequence.

The inventive batch-RO apparatus may comprise more than one HA inline and/or RO-skid made of N module, each of n membrane elements, and such a design with two HA is illustrated in FIG. 7 during a desalination mode, in FIG. 8 during the mode of brine replacement with fresh feed and in FIG. 9 during the mode of fresh feed recharge of HAs.

Desalination in the inventive batch-RO apparatus under fixed flow and variable pressure conditions proceeds with a linear decline of the intrinsic closed circuit volume and with linear permeate production on the sequential time scale as well as on the recovery scale. The specific energy and permeates quality at a given recovery level during this batch-RO desalination process under said conditions correspond to the average (ay-SE and av-TDS) of the preceding steps on the recovery scale. By analogy with said batch-RO desalination process in the inventive apparatus, the related semi-batch CCD process also takes place under fixed flow and variable pressured conditions but in a fixed intrinsic closed circuit volume with recycled concentrates continuously blended with pressurized feed supplies, and such a process proceeds with fixed duration cycles of same permeate production with av-SE and av-TDS of permeates correspond to the average of the preceding cycles and expressed exponentially on the recovery scale. Unlike CCD which proceeds by fixed cycles, each of the same inlet and outlet module concentrations under the same applied pressure, the batch-RO process proceeds with continuously changing inlet and outlet module concentrations and applied pressure of no discrete cycles and their accumulation effects. The av-SE of a perfect batch-RO process is found parallel to the least minimum energy under infinitesimal flux conditions with added energy expressing the effects of flux and efficiency of hydraulic pressurizing means.

Batch-RO desalination in the inventive apparatus could not be made continuous on a consecutive sequential basis in light of the need for brine removal and feed recharge of the HA which requires the stopping of desalination at the end of each batch sequence. Despite of this limitation, permeate productivity in said batch-RO apparatus could remain relatively high pending the choice of a fast LPFP which could shortens the duration of the steps in the process without desalination.

The illustrated Example described hereinafter reveals that the batch-RO inventive apparatus enables highest recovery with the lowest energy consumption amongst all known RO techniques available today, including the next best technique that of CCD, and in additions provides good quality permeates. Permeates' volume production per sequence in the inventive batch-RO apparatus is confined by the volume displacement of its HA and the use of conventional 16" diameter PV as HA does opens the door for small scale (up to 10 m$^3$/h, 240 m$^3$/day) applications. A noteworthy application in this context relates to the desalination of treated domestic and/or industrial effluents with exceptionally high recovery (≥95%) and low energy to a near zero liquid discharge (ZLD) level with maximum water savings for reuse.

It will be understood to the skilled in the art that the inventive batch-RO apparatus of the preferred embodiment and its modes of actuation enable low energy high recovery desalination of salt water solutions according to FIGS. 1-9, that these figures are schematic and simplified and are not to be regarded as limiting the invention, but as several examples of many for the diverse implementation of the invention. In practice, the inventive apparatus may comprise many additional lines, branches, valves, and other installations and devices as deemed necessary according to specific requirements while still remaining within the scope of the invention's claims. For instance, the adding of dosing means of antiscalat and/or for a pH modifying solutions at inlet to the RO-skid in said apparatus and/or other functions which would be required for specific applications would not be considered departure from the scope of the invention and its claims.

It will be understood to the skilled in the art that means associated with pressurizing feed, boosting feed pressure, concentrates recycling, hydraulic-arms, conducing lines, flow manipulation by valves, and online monitoring devices of pressure, flow/volume, pH, temperature, and electric-conductivity of salts water solution and permeates are comprised of ordinary commercial components such as a pressure pump, a circulation pump (CP), a valve device, and, pressure vessels (e.g., 8", 16" and larger diameters), or several such components that are applied simultaneously in parallel or in line as appropriate. It is further understood that the referred monitoring means and their transmitted signals to a computerized control board are essential for the actuation and control of specific components within said inventive apparatus.

It will be obvious to the skill in the art that the design of the inventive apparatus is not confined by the number of modules and/or element-number per module and/or the type of modules and elements in each said RO skid, nor by the number of hydraulic-arms and therefore, said inventive apparatus may also apply to large scale desalination plants pending the availability of large enough hydraulic-arms capable to withstand the maximum pressure needs for a specific desalination application.

While the invention has been described hereinabove in respect to particular embodiments, it will be obvious to those versed in the art that changes and modifications may be made without departing from this invention in its broader aspects, therefore, the appended claims are to encompass within their scope all such changes and modifications that fall within the true spirit of the invention.

Example

The example illustrates the application of the inventive apparatus for high recovery (~95%) low energy (~0.42 kWh/m$^3$) desalination of treated effluents with salinity equivalent to that of 3,000 ppm (0.3%) NaCl solution. The performance illustration is of an inventive apparatus comprising a single-module RO-skid of 3 elements (ME3, E=ESPA2–MAX) and 54 liter intrinsic volume; two hydraulic-arms (16" diameter PV, 430 cm long each) of 1.075 liter effective displacement volume; HPHP-vfd of 1.84 m$^3$/h and 90% eff.; CP-vfd of 5.51 m$^3$/h and 75% eff.; LPFP of 20 m$^3$/h and 75% eff.; and MD-vfd of 70%. The above selected flow rate set-point imply the followings; fixed flow variable pressure desalination with 15 lmh flux; 25% module recovery; 9% average element flow; 1.156 average concentration polarization; 0.47 bar module pressure difference ($\Delta p$); and a 35 minute batch desalination sequence of 1.075 liter produced permeates. Brine replacement with feed (~15 sec.) and feed recharge of hydraulic-arms with feed (194 sec.) through LPFP (20 m$^3$/h) take together ~3.5 minute and this means an overall sequence time of 38.5 minute during which desalination is experienced 90.9% of the time and functions not engaged with the desalination experienced during the rest of the time (9.1%). Accordingly, the effective permeate production of said apparatus amounts to 1.672 m$^3$/h or 40.14 m$^3$/day.

Figure 10:
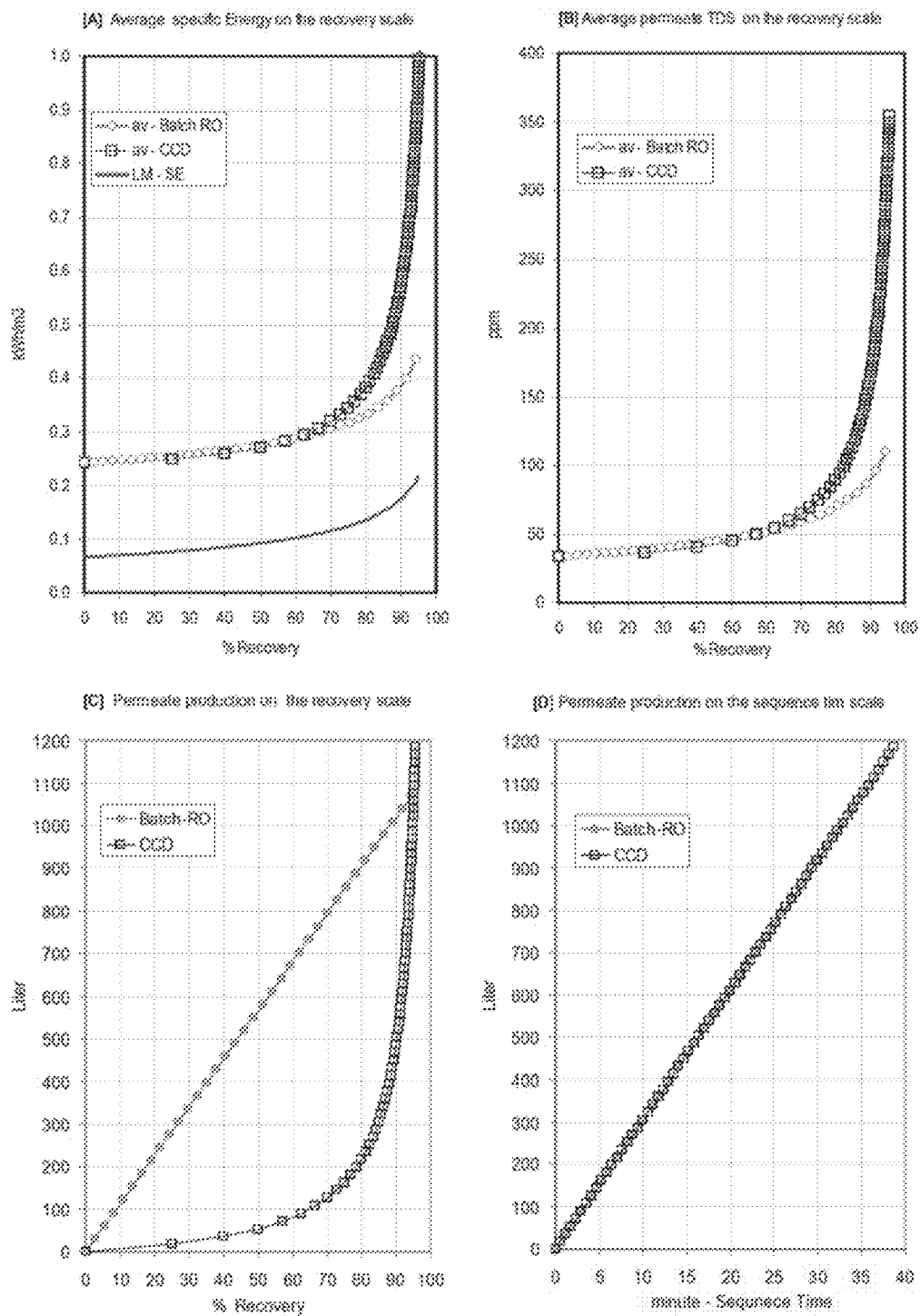
FIG. 10 schematically illustrates simulation results on recovery of specific energy [A], TDS of permeates [B], and permeate volume production [C], as well as the latter on a time scale [D], for by the operation of the inventive batch-RO apparatus with a single ME3 (E=SPA2-MAX) module and a single HA made of 16" diameter pressure-vessel of 430 cm length of 1,075 liter effective displacement volume, with feed of 3,000 ppm TDS at 15 lmh flux, 25% module recovery with the pumps efficiencies of 90% for HPHP and 75% for CP), whereby the simulation results are shown in comparison with those of a semi-batch system (CCD) of same RO-Skid design under the same operational conditions.

The simulated performance of said batch-RO inventive apparatus of the above cited design features and operational set-points under fixed flow and variable pressure condition as compared with that of a semi-batch CCD system of the same RO-skid [3 elements (ME3, E=ESPA2–MAX) and 54 liter intrinsic volume] under the same operational conditions, are displayed FIG. 10[A-D] with respect to average specific energy [A], average TDS of permeates [B], permeate volume production on the recovery scale [C] and permeate volume production on the sequence time scale [D]. Spacers on the batch-RO curves are per minute and those on the semi-batch CCD curves are per cycle each of 0.59 minute duration and 18.0 liter/minute permeate production rate. Permeate production on the time scale of both processes is identical [D]; whereas, such production on the recovery scale is linear for batch-RO and exponential of the semi-batch CCD process [C]. The build-up of permeates on recovery in the batch-RO process proceeds in a linear uniformed manner; whereas, that of the analogous semi batch process increases exponentially with a sharp rise per subsequent cycle taking place above 70% recovery, explaining the differences of the av-specific energy [A] and av-TDS of permeates [B] between the compared processes. The inferior results for CCD above 70% represent the increased statistical weight of subsequent cycles on the sequence average. Noteworthy in FIG. 10A is reference made to the theoretical least minimum specific energy curve under infinitesimal flux conditions (LM-SE) which appears in parallel below the batch-RO curve with energy difference between them arising from the operational flux and the efficiency of pumps in the exemplified batch-RO process, in complete consistency with theory.

The invention claimed is:

1. An apparatus for batch closed circuit desalination of a salt water solution feed by reverse osmosis (RO) comprising: hydraulic power means (HP), hydraulic-arm (HA) means, RO means, and feed recharge means (FR), wherein
said HP comprising a line of hydraulic fluid (HF) with a high pressure hydraulic pump for the delivery of pressurized HF from a hydraulic fluid reservoir (HFR) to said HA and thereby providing hydraulic power to said apparatus, a non-pressurized HF line for non-pressurized HF return from said HA to said HFR, and a two-way actuated valve means and a one-way check valve means configured to supply pressurized HF to said HA or alternatively to retrieve non-pressurized HF from said HA to said HFR;
said HA comprising a single pressure vessel (PV) with a separation disc (SD) inside between said HF and said feed, or a plurality of said PVs connected in parallel, wherein HF is supplied from a first end of said HA whereas said feed and concentrates of said feed created inside said HA during RO desalination are supplied from a second end of said HA and the second end of said HA also comprises a mixing device (MD) means comprising an electric or electromagnetically driven mixer to enable blending of said concentrates inside said HA;
said RO comprising a RO-skid with one or more modules of a selected number of membrane elements, with inlet and outlet lines connected in parallel, and a recycling line with a circulation means for closed circuit recycling of said concentrates blend inside said HA through said RO-skid, said circulation means comprising a circulation pump (CP) of low pressure difference; and
said FR comprising a feed line with a low pressure supply means connected to said concentrates blend recycling line, a brine removal line extension from said concentrate recycling line, a two-way actuated valve means and a one-way check-valve means for controlling flow through the feed line, the concentrates blend recycling line, and the brine removal line extension to enable one of three discrete operations at a time: said concentrates blend recycling during RO, or said brine removal between RO sequences, or feed recharge of said HA between RO sequences also associated with said HF release to said HFR;
said apparatus further comprising:
online monitoring means of pressure on the inlet (Pin) and outlet (Pout) lines of said RO-skid, flow or volume on said recycling line down stream of said circulation means (FVCP), and flow or volume on said pressurized HF line to said HA (FVH); and
a computerized control board means whereby operation of said apparatus is managed automatically on the basis of said online monitored data in conjunction with selected-flow rate and volume set-points.

2. An apparatus according to claim 1 wherein said pressurizing means comprise a high pressure hydraulic pump (HPHP) with a variable frequency drive (vfd) means configured to operate at a fixed flow and variable pressure, with an aid of a flow or volume means located upstream or downstream (FVH) of said pump.

3. An apparatus according to claim 1, wherein said circulation pump (CP) of low pressure difference operates with a variable frequency drive (vfd) means capable of a fixed flow operation with an aid of a flow or volume means located upstream or downstream (FVCP) of said pump.

4. An apparatus according to claim 1, wherein said electric or electromagnetically driven mixer comprises a variable frequency drive (vfd) means configured to mix said recycled concentrates inside said HA at a beginning of a desalination sequence with a progressively declined mixing rate towards an end of said sequence.

5. An apparatus according to claim 1, wherein said low pressure supply means comprise a low pressure feed pump (LPFP) of high flow delivery rate to enable said brine removal and feed recharge steps to be completed between RO sequences.

6. An apparatus according to claim 1, wherein said computerized control board means is operable to actuate said apparatus automatically by the following steps:
(1) proceeding Batch-RO with selected flow rate set-points of said HPFP-vfd and CP-vfd and mixing rate of said MD-vfd means configured to enable execution of a batch-RO desalination sequence with a declined mixing rate, wherein Batch-RO desalination is stopped when a cumulative HF volume, defining a cumulative permeate volume, monitored by said $FV_H$ means reaches a predefined volumetric set-point (VHF) which signifies an end of said batch RO sequence;
(2) when said $V_{HF}$ volumetric set-point is reached, said pumps and said MD-vfd means become idle, valve means are configured to enable brine removal and brine replacement by fresh feed, and said LPFP activated until the replaced brine volume monitored by said $FV_{CP}$ means matches a volumetric set-point ($V_B$) of a complete brine removal;
(3) when said $V_B$ volumetric set-point is reached, valve means are activated to stop brine removal and enable feed recharge of said HA as well as to enable back flow HF from said HA to said HFR, until the feed volume admitted to said HA and monitored by said $FV_{CP}$ means match a volumetric set-point ($V_{RO}$) of a completely recharged HA-$V_{RO}$ monitored by $FV_{CP}$ and $V_{HF}$ monitored by $FV_H$ are of identical volumetric value; and
(4) when said $V_{RO}$ volumetric set-point is reached, valve means are activated to operate batch-RO sequence, said HPFP-vfd, CP-vfd and MD-vfd means are activated and a new batch-RO sequence is initiated according to step (1).

7. An apparatus according to claim 1, wherein said hydraulic fluid is a hydraulic fluid including permeates received during operation of said apparatus.

8. An apparatus according to claim 1, wherein said salt water solution feed is an aqueous solution containing salts.

* * * * *